(12) United States Patent
Gaterman

(10) Patent No.: US 7,568,796 B1
(45) Date of Patent: Aug. 4, 2009

(54) EYEGLASSES FRAME WITH WEIGHTED MEMBER HANGING THEREFROM

(76) Inventor: William Gaterman, 114 Meadowbrook Cir., Daytona Beach, FL (US) 32114

( * ) Notice: Subject to any disclaimer, the term of this patent is extended or adjusted under 35 U.S.C. 154(b) by 0 days.

(21) Appl. No.: 12/111,882

(22) Filed: Apr. 29, 2008

(51) Int. Cl.
*G02C 11/02* (2006.01)
(52) U.S. Cl. .......................... 351/52; 351/51; D16/330
(58) Field of Classification Search .................. 351/51, 351/52, 111, 116; D16/300, 330, 335, 336
See application file for complete search history.

(56) References Cited

U.S. PATENT DOCUMENTS

| | | | |
|---|---|---|---|
| 2,766,657 A | 10/1956 | Nathan | |
| 3,441,341 A | 4/1969 | Dunn | |
| 4,153,346 A | 5/1979 | Gomer | |
| 5,161,234 A | 11/1992 | Nitta | |
| 5,557,345 A | 9/1996 | Katzenmeyer et al. | |
| 6,705,720 B2 | 3/2004 | Brown et al. | |
| 6,863,394 B1 | 3/2005 | Nelson et al. | |
| 2007/0236650 A1 | 10/2007 | Jain | |
| 2007/0242214 A1 | 10/2007 | Carter | |

*Primary Examiner*—Darryl J Collins
(74) *Attorney, Agent, or Firm*—Egbert Law Offices PLLC

(57) ABSTRACT

An apparatus has a frame, a pair of lenses affixed within the frame, a single temple hingedly connected to one side of the frame, and a weighted member affixed to an opposite side of the frame. The weighted member hangs downwardly from the opposite side of the frame. The frame has a first hinge joined to the temple and a second hinge to which the weighted member is attached. The temple that would be attached to the second hinge has been removed. The second hinge includes an arm extending rearwardly from the frame with a slot formed therein. A loop of the weighted member is received within the slot. The weighted member has a weight equal to a weight of the single temple.

17 Claims, 1 Drawing Sheet

EYEGLASSES FRAME WITH WEIGHTED MEMBER HANGING THEREFROM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to eyeglasses frames. More particularly, the present invention relates to eyeglasses frames that have only a single temple. Additionally, the present invention relates to an eyeglasses frame in which a weighted member can be used to replace one of the temples of thee eyeglasses frame such that the eyeglasses are properly balanced on the head of a user.

2. Description of Related Art Including Information Disclosed Under 37 CFR 1.97 and 37 CFR 1.98.

Eyeglasses have a fairly standard form. Conventional eyeglasses include a frame with a pair of lenses received therein. A bridge is formed in the frame so as to extend between the lenses. A nosepiece is also affixed to the frame so as to allow the eyeglasses to be supported upon a nose. A pair of temples are hingedly connected to opposite sides of the eyeglasses frame so that the temples can wrap around the ears of the wearer for proper support on the head of the user. These temples extend along the sides of the head so as to join with the frame. Typically, the temples are foldable inwardly and outwardly so as to allow for easy stowage and easy deployment.

Under many circumstances, eyeglasses can become uncomfortable for the user. Under certain circumstances, rashes or other injuries can occur on the side of the head of the wearer. Whenever there are such rashes and/or injuries, the placement of the temple along the injured side of the head can cause continuing discomfort to the wearer. In other circumstances, the earpiece of the temple can uncomfortably dig into the back of the ears and create further discomfort.

Under these circumstances, users have resorted to a wide variety of techniques so as to protect the injured side of the head or to protect against a digging of the earpiece into the ears. Under certain circumstances, tape is wrapped around the earpiece so as to distribute the weight of the earpiece over a wider area. This can serve to avoid discomfort to the wearer. In other circumstances, cotton, or other resilient material, is applied along the inner surface of the earpiece so as to space the earpiece from the injured side of the head. In other circumstances, one of the earpieces is removed so that this continuing discomfort can be avoided.

Unfortunately, when an earpiece is removed, the eyeglasses will tend to reside in a skewed orientation on the face of the wearer. This can create an unattractive appearance for the eyeglasses. Often, vision is impaired through the eyeglasses by these mechanisms for adjusting the placement of the temple. As such, a need has developed so as to develop an eyeglasses frame which avoids the discomfort caused by the placement of the temple against one side of the head.

In the past, various patents have been issued relating to such eyeglasses. U.S. Pat. No. 6,863,394, issued on Mar. 8, 2005 to Nelson et al., shows an ornamental attachment for selective attachment to an existing pair of eyeglasses. The ornamental attachment has a hinge screw portion, a curved portion extending from the hinge screw portion, and an attachment portion extending from the curved portion. The attachment portion has a decorative ornament extending laterally therefrom. The hinge screw portion is selectively inserted into the hinged junction of the eyeglasses after the hinge screw has been selectively removed therefrom. A small clip is affixed to a free end of the hinge screw portion in order to secure the ornamental attachment to the pair of eyeglasses.

U.S. Pat. No. 6,705,720, issued on Mar. 16, 2004 to Brown et al., provides reading glasses that are designed to be discrete and easily transported. The reading glasses include a lens, a nosepiece, and a weighted counterbalance. A supporting bar interconnects the nosepiece between the lens and the counterbalance. The lens, the nosepiece and the counterbalance is adjustably displaceable about and along the supporting bar for maintaining balance.

U.S. Pat. No. 5,557,345, issued on Sep. 17, 1996 to Katzenmeyer et al., provides interchangeable tethered glasses for adjustably positioning relative to the face of an individual for filtering light. These glasses include a frame assembly for supporting a pair of lenses over the eyes of the individual. An ear-engaging assembly extends from opposed sides of the frame assembly for engaging ears of the individual to secure the frame assembly relative thereto. The ear-engaging assembly includes a tether extendable over the ears of the individual and a weight coupled to a distal end of the tether for maintaining a desired tension within the tether.

U.S. Pat. No. 5,161,234 describes hanging ornaments for eyeglasses that are freely attachable to an eyeglass frame. The ornaments are attached by connecting loop-like hanging portions to temple pieces of eyeglasses by way of a link-type fastener.

U.S. Pat. No. 4,153,346, issued on May 8, 1979 to B. Gomer, teaches combined sunglasses and ear pendants. This pair of decorative sunglasses has temples of chain or cord sized to extend over and behind the ears and down to the earlobe. The chain or cord connects to a pendant suspended therefrom.

U.S. Pat. No. 2,766,657, issued on Oct. 16, 1956 to E. K. Nathan, discloses a shiftable spectacle. This spectacle is comprised of a single temple hingedly connected to the eyeglasses frame. A decorative portion is connected to the earpiece on the single temple of the eyeglasses.

U.S. Patent Publication No. 2007/0242214, published on Oct. 18, 2007 to T. L. Carter, describes an earpiece-less eyeglasses frame having a removable retainer strap. Attachment mechanisms on each side of the lenticular frame enable a retainer strap to be directly connected to the frame. The retainer strap includes an end-piece at each end of the strap that is compatible with the two attachment mechanisms for attaching the strap to the frame and for removing the strap from the frame. A sliding clasp is used to adjust tension on the retainer strap for different activities.

U.S. Pat. No. 3,441,341, issued on Apr. 29, 1969 to G. T. Dunn, discloses an eyeglasses frame which has a single lens with a nosepiece for fitting over the nose of the wearer and a slidable temple extending outwardly from an opposite side thereof. The single temple is foldable in different directions for compact stowage.

U.S. Patent Publication No. 2007/0236650, issued on Oct. 11, 2007 to A. Jain, teaches eyeglasses that have a lens frame in which lenses are mounted. Proximal ends of the flexible temple members are removably attachable to opposite sides of the lens frame. The temple members are sized to extend over and behind the ears to the vicinity of the earlobe. A counterweight is attached to the end of the temple members by a releasable fastener.

It is an object of the present invention to provide an eyeglasses frame which allows eyeglasses with a single temple to be worn comfortably.

It is another object of the present invention to provide an eyeglasses frame which provides comfort to the wearer after one of the temples has been removed.

It is another object of the present invention to provide an eyeglasses frame which provides proper balance and avoids skewing of the eyeglasses frame.

It is another object of the present invention to provide an eyeglasses frame which presents a unique decorative appearance.

These and other objects and advantages of the present invention will become apparent from a reading of the attached specification and appended claims.

BRIEF SUMMARY OF THE INVENTION

The present invention is an eyeglasses apparatus that comprises a frame, a pair of lenses affixed to the frame, a single temple hingedly connected to one side of the frame, and a weighted member affixed to an opposite side of the frame. The weighted member hangs downwardly from the opposite side of the frame. In the present invention, the frame is conventional frame that has one of temples removed.

In particular, the frame has a first hinge joining the temple with the frame and a second hinge. The weighted member is secured to the second hinge after the temple is removed therefrom. The second hinge comprises an arm extending rearwardly of the frame and a pin affixed to the arm. The arm has a slot formed therein at an end of the arm opposite the frame. The weighted member is received in the slot forward of the pin.

In the present invention, the weighted member includes a body and a loop affixed to a top side of the body. The loop is received within the slot of the arm. In the preferred embodiment of the present invention, the body comprises a discoidal member. However, within the concept of the present invention, narrows shapes of weighted members can be used.

In the present invention, the second hinge has no temple attached thereto. The weighted member has a weight approximately equal to a weight of the single temple. The weighted member dangles freely on the opposite side of the frame.

DETAILED DESCRIPTION OF THE INVENTION

Figure 1:
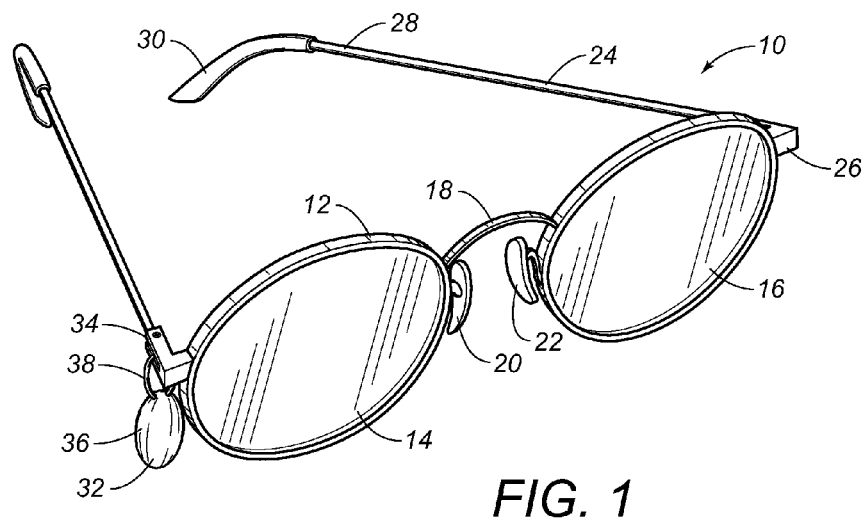
FIG. 1 is a perspective view showing the eyeglasses frame in accordance with the preferred embodiment of the present invention.

Referring to FIG. 1, there is shown the eyeglasses assembly 10 in accordance with the preferred embodiment of the present invention. The eyeglasses assembly 10 includes a frame 12 having a pair of lenses 14 and 16 affixed thereto. A bridge 18 is formed in the frame 12 and extends between the pair of lenses 14 and 16. Nosepiece supports 20 and 22 extend inwardly from the lenses 14 and 16 so as to provide support for the eyeglasses frame 12 upon the nose of a wearer.

The eyeglasses assembly 10 of the present invention includes a single temple 24 hingedly connected to a side 26 of the frame 12. The temple 24 has an elongate portion 28 extending from the hinge 26 to an earpiece 30. The earpiece 30 is configured so as to wrap around the back of the ear of a wearer.

A weighted member 32 is affixed to the frame 12 on a side of the frame 12 opposite the hinge 26. The temple previous connected to hinge 26 has been removed. The weighted member 32 is connected to a hinge 34 on this opposite side. The weighted member 32 includes a discoidal member 36 hanging downwardly from the hinge 34 by a loop-type connector 38. The weighted member 32 should have a weight approximately equal to the weight of the temple 24.

In FIG. 1, it can be seen that the temple that would extend from the hinge 34 at the opposite side of the frame 12 from temple 24 has been removed from hinge 34. As such, the weighted member 32 provides the proper support to this opposite side of the frame 12.

In normal use, the eyeglasses assembly 10 is placed upon the face and head of a wearer by simply positioning the nosepiece supports 20 and 22 upon the nose. The bridge 18 will extend across the top of the nose. The lenses 14 and 16 will be supported in a proper position directly in front of the eyes of the wearer. The temple 24 will provide support on one side of the head of the wearer. The weighted member 32 provides an equal amount of support on the opposite side of the head of the wearer.

In the configuration shown in FIG. 1, since the temple extending from the hinge 34 has been removed, there is no problem with irritation or further injury caused by the placement of a temple in this area. For example, when the wearer has a cut or abrasion on the back of the ear, the removal of the temple will avoid further abrasion or injury to this area. Additionally, if the side of the head of the wearer should have an injury or a rash thereon, there will be no surface of a temple that will continually rub against this problem area. As such, the present invention enhances the comfort to the user. Since the weighted member 32 has a weight approximately equal to the weight of temple 24, the lenses 14 and 16 will remain in their proper position in front of the eyes of the wearer. The present invention avoids any possible skewing of the lenses 14 and 16. This support securely maintains the eyeglasses assembly 10 in its proper position on the head of the wearer.

Additionally, the eyeglasses assembly 10 of the present invention provides a unique asymmetrical appearance to the eyeglasses assembly. In particular, the dangling weighted member 32 serves as a decorative object on one side of the eyeglasses assembly 10. The loop-type connector 38 securely maintains the weighted member 32 in a proper dangling position without causing contact between the weighted member 32 and the face or head of the wearer. Various types of weighted members can be used. In the preferred embodiment, the weighted member 32 is a discoidal member 36. However, within the concept of the present invention various other decorative shapes, configurations or surfaced articles can be utilized as the weighted member 32. Unlike symmetrical eyeglasses, the present eyeglasses assembly 10 presents a unique, decorative and unusual appearance.

Figure 2:
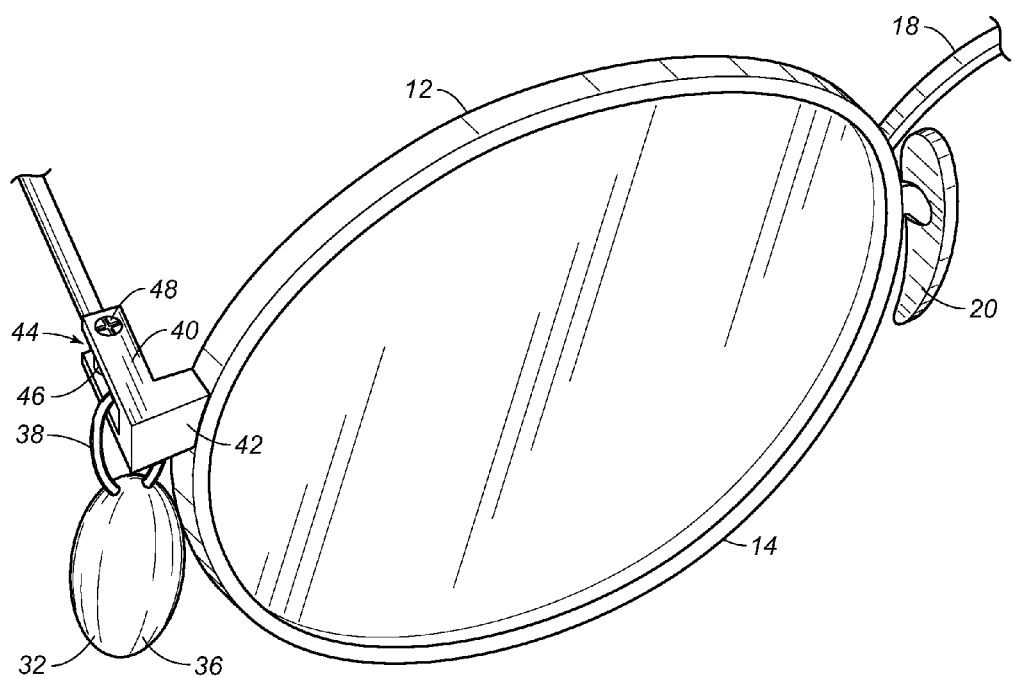
FIG. 2 is a detailed view showing the attachment of the weighted member to the hinge of the eyeglasses frame.

FIG. 2 is a detailed view of the portion of the eyeglasses assembly 10 which includes the weighted member 32. As can be seen, the frame 12 has an arm 40 extending from the side 42 of the frame 12. The arm 40 extends rearwardly and generally transverse to the plane of the frame 12. A slot 44 is formed in the arm 40 at an end opposite the frame 12. A pin 46 extends across the slot 44. A head 48 is connected to the pin 46. Head 48 can have a suitable slot so that the pin 46 can be easily removed therefrom, as desired.

The weighted member 32 has the loop-type connector 38 affixed to an upper end thereof of the discoidal member 36. The loop-type connector 38 is received within the slot 44 forward of the pin 46. As such, the weighted member 32 will freely dangle from the arm 40. The interior of the loop-type connector 38 will have a greater diameter than a side of the arm 40.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
   a frame;
   a pair of lenses affixed within said frame;
   a single temple hingeably connected to one side of said frame; and
   a weighted member affixed to an opposite side of said frame, said weighted member hanging downwardly from said opposite side of said frame.

2. The apparatus of claim 1, said frame having a first hinge joining said temple with said frame and a second hinge, said weighted member secured to said second hinge.

3. The apparatus of claim 2, said second hinge comprising:
   an arm extending rearwardly from said frame, said arm having a slot formed therein at an end of said arm opposite said frame; and
   a pin affixed to said arm and extending across said slot, said weighted member received in said slot forward of said pin.

4. The apparatus of claim 3, said weighted member comprising:
   a body; and
   a loop affixed to a top side of said body, said loop received in said slot of said arm.

5. The apparatus of claim 4, said body being a discoidal member.

6. The apparatus of claim 2, said second hinge having no temple attached thereto.

7. The apparatus of claim 1, said weighted member having a weight equal to a weight of said single temple.

8. The apparatus of claim 1, said weighted member dangling freely on said opposite side of said frame.

9. An improved eyeglasses assembly comprising:
   a frame having a single temple extending from a side thereof; and
   a weighted member connected to an opposite side of said frame, said weighted member having a weight approximately equal to a weight of said single temple.

10. The improvement of claim 9, said frame having an arm extending rearwardly from said opposite side thereof, said arm having a slot formed therein, said weighted member received in said slot.

11. The improvement of claim 10, said arm having a pin affixed thereto and extending across said slot, said weighted member received in said slot forward of said pin.

12. The improvement of claim 9, said weighted member comprising:
   a body; and
   a loop affixed to a top side of said body, said loop received in said slot of said arm.

13. The improvement of claim 12, said body being a discoidal member.

14. The improvement of claim 9, said weighted member dangling freely on said opposite side of said frame.

15. An article for attachment to an eyeglasses frame in which one of the temples of the eyeglasses frame is removed, the article comprising:
   a weighted member having a weight generally equal to a weight of the remaining temple of the eyeglasses frame; and
   a means for attaching said weighted member to a hinge of the eyeglasses frame.

16. The article of claim 15, said means for attaching comprising:
   a loop affixed to a top side of said weighted member, said loop secured to said hinge.

17. The article of claim 15, said weighted member being a discoidal member.

* * * * *